United States Patent [19]

Koshiba et al.

[11] Patent Number: 4,987,000
[45] Date of Patent: Jan. 22, 1991

[54] MECHANICAL PLATING PROCESS

[75] Inventors: Yoshikazu Koshiba; Yuji Ikegami; Noboru Tachino; Takeshi Kamiya, all of Kawasaki, Japan

[73] Assignee: Nippon Yakin Kogyo Co., Ltd., Tokyo, Japan

[21] Appl. No.: 282,681

[22] Filed: Dec. 12, 1988

[30] Foreign Application Priority Data

Dec. 21, 1987 [JP] Japan .............................. 62-321345
Jul. 6, 1988 [JP] Japan .............................. 63-166956
Jul. 6, 1988 [JP] Japan .............................. 63-166957

[51] Int. Cl.$^5$ .............................................. B05C 11/00
[52] U.S. Cl. .................................... 427/11; 427/357; 427/367; 427/368; 118/76; 118/77
[58] Field of Search .............. 427/11, 357, 367, 368, 427/429; 118/76, 77

[56] References Cited

U.S. PATENT DOCUMENTS

| | | | |
|---|---|---|---|
| 2,914,425 | 11/1959 | McGuire | 427/11 |
| 3,700,505 | 10/1972 | Kanter | 427/11 |
| 4,202,915 | 5/1980 | Clayton | 427/11 |
| 4,293,584 | 10/1981 | Clayton | 427/11 |
| 4,622,914 | 11/1986 | Garris | 118/77 |

FOREIGN PATENT DOCUMENTS 863087 3/1961 United Kingdom ................. 427/11

Primary Examiner—Norman Morgenstern
Assistant Examiner—Margaret Bueker
Attorney, Agent, or Firm—Sherman and Shalloway

[57] ABSTRACT

This invention concerns a mechanical plating process comprising: shaving metal off from a pure metal or alloy block and plating an object to be plated with the shaved off metal by the use of at least a single metal brush, wherein the metal block and the metal brush are in frictional contact with each other, and the object to be plated and the metal brush are concurrently in frictional contact with each other.

4 Claims, 3 Drawing Sheets

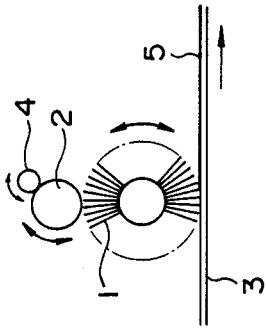
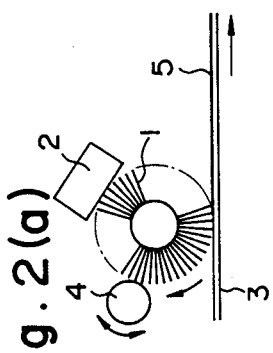
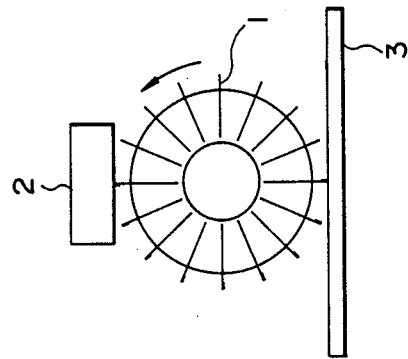
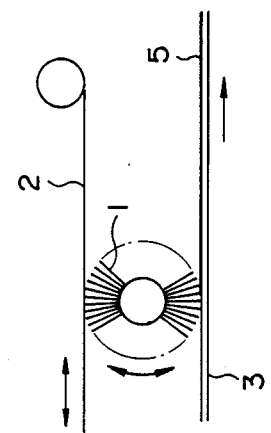
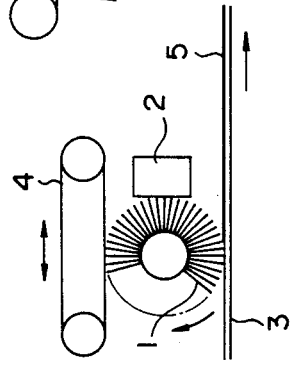

4,987,000

MECHANICAL PLATING PROCESS

FIELD OF THE INVENTION

This invention relates to a plating process applicable to various industrially produced goods that require corrosion resistance, heat-resistance, abrasion-resistance, solderability, platability or decorability.

DESCRIPTION OF THE PRIOR ART

Among conventional plating processes employed for various materials or parts are electroplating, chemical plating, hot dipping or flame spraying; these processes are applied in their own ways according to circumstances in order to provide a thin metal coat on the surface of an object.

Electroplating is made in aqueous solutions containing ions of metal to be plated with DC current being applied between the negative electrode, an object to be plated, and the positive electrode. Chemical plating does not need electricity; it is employed when insulating objects such as glass or plastic are to be plated. Hot dipping is made in molten metal by dipping an object to be plated in it. Flame spraying is made with molten metal being sprayed on an object to be plated with a jet of gas or air compressed. These processes have their own merit but drawbacks or problems at the same time.

That is, it is difficult to plate alloy by electroplating. Chemical plating does not provide a thick metal layer on an object, while it needs expensive chemicals. In hot dipping it is difficult to adjust the thickness of metal layer on an object, while it is convenient to plate the inside of a pipe, for example, merely by dipping a pipe. Flame spraying tends to make an object porous; besides, metal particle is subject to oxidation. However, their greatest common problems of all are that the adhesion of plated metal and an object is not necessarily assured; apparatuses required for their processes are generally expensive; electroplating and chemical plating require a treatment process for discharging their spent solutions.

In order to solve these problems, the present inventors already offered a proposal of mechanically plating an object with a pure metal or alloy brush being in frictional contact with the object. However, they found that the brush had problems in being subject to oxidation, too expensive for practical use, and readily falling out.

SUMMARY OF THE INVENTION

Accordingly, it is an object of this invention to provide a mechanical plating process completely free from drawbacks in conventional electroplating, chemical plating, hot dipping, and flame spraying processes. It is another object of this invention to provide a mechanical plating process of which a metal brush is hardly oxidized, and falls out. And, these objects can be accomplished by a mechanical plating process, characterized by comprising: shaving metal off from a pure metal or alloy block and plating an object to be plated with the shaved off metal by the use of at least a single metal brush, wherein the metal block and the metal brush are in frictional contact with each other, and the object to be plated and the metal brush are concurrently in frictional contact with each other.

BRIEF DESCRIPTION OF THE DRAWINGS

FIG. 1 is a schematic illustration showing one of the apparatuses by which this invention can be practically embodied;

FIGS. 2(a) through (d) are schematic illustrations showing other embodiment of this invention;

In FIGS. 3 through 6, the results of the examples of this invention and comparative examples are shown together in the same graph as solid and open circles for comparison respectively. Detailed Description of the Preferred Embodiment of this invention In this invention, a metal block, an object to be plated, and a metal brush for use in plating can be combined variously with one another in practical use. But in principle, a metal block has to be softer than or as hard as a metal brush. For example, a metal block and a metal brush may be made of the same metal; also, an aluminium block and a copper brush can be combined, as well as a copper block and a steel brush. As for an object to be plated, many materials can be used for it with no limitation in particular. That is, Fe-42% Ni alloy, stainless steel and so forth can be used similarly.

Because metal of a block clings to a brush in this invention, the oxidation of the brush can be prevented unlike in a conventional mechanical plating process. FIG. 1 shows one of the apparatuses by which this invention can be put into practice. In the FIGURE, 1 denotes a metal brush, 2 denotes a metal block, and 3 denotes an object to be plated. The surface of the object 3 is plated with metal of the block 2 by means of the metal brush 1 touching both the metal block 2 and the object 3, being rotated as fast as about 2400 rpm for example. In the FIGURE, the metal block 2 is located above the object 3 to be plated with the metal brush 1 in between. But it is needless to say that the metal block 2 and the object 3 may be positioned elsewhere around the metal brush 1.

Figure 3:
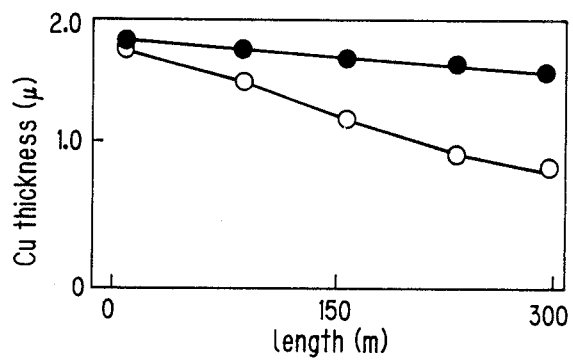
FIG. 3 is a graph showing a change in the thickness of plated copper layer along the longitudinal direction of a foil in Example 2.

Now with reference to FIGS. 2(a) and (b), another embodiment of this invention will be described below in detail. This is a mechanical plating process comprising: shaving metal off from a pure metal or alloy block and plating an object to be plated with the shaved off metal by the use of at least a single metal brush, wherein the metal block and the metal brush are in frictional contact with each other, and the object to be plated and the metal brush are concurrently in frictional contact with each other, characterized by conducting the mechanical plating process while removing small metal particles from the metal brush with a grinder or a cutting tool, the small metal particles being shaved off from the metal block but not yet plated on the object clinging to the metal brush.

In this mechanical plating process, the grinder or the cutting tool is disposed on the circumference of the metal brush between where the metal block comes into contact with the metal brush and where the object to be plated comes into contact with the metal brush. According to this process, since small metal particles of the metal block, shaved off from the metal block but not yet plated on the object clinging to the metal brush, can be removed from the brush by the grinder or the cutting tool in contact with the metal brush, they are prevented from adhering to the metal block again so firmly as to form a hard crust thereon that the metal block can be used continuously, and this makes it possible to conduct the mechanical plating process in a continuous manner.

In this process, as far as their hardness is concerned, a metal block, a metal brush, and an object to be plated can be combined variously with one another in practical use. But in principle, the metal block has to be softer than or as hard as the metal brush. Moreover, the grinder or the cutting tool, for example, a bite, is enough if only they are so hard as to be able to shave the metal off from the metal block; and as for the shape of the metal block, there is no limitation in particular if only the metal block has a face with which it can be in contact with the metal brush.

FIGS. 2(a) and (b) are a schematic illustration showing this process, in which 1 denotes a metal brush, 2 denotes a metal block, 3 denotes an object to be plated, 4 denotes a grinder (FIG. 2(a)) or an endless belt type abrasive tool (FIG. 2(b)), and 5 denotes a plated metal layer.

The metal layer 5 can be formed on the object 3 with the metal brush 1, touching both the metal block 2 and the object 3, being rotated as fast as its circumferential speed attains about 2000 meters a minute, for example. Also, since the metal brush 1 and the grinder/the cutting tool 4 are in contact with each other in such a way as to remove small metal particles from the metal brush, the re-adhesion of the small metal particles to the metal block 2, which causes the formation of a hard tenacious crust on the metal block, is prevented completely; in consequence, a continuous mechanical plating can be conducted over many hours with the surface of the metal block being kept as fresh as ever; thus, there forms a metal layer very uniform in thickness on the object.

According to this invention, a third mechanical plating process can also be embodied in a continuous manner with the surface of the metal block being similarly kept fresh. When the metal block is crusted with metal, shaved off from itself but not yet plated on the object, the metal develops into too hard a crust to be shaved off by the metal brush such that the amount of metal available to be plated on the object becomes more and more lessened, whereby not only does the time for plating increase but also the thickness of plated metal becomes irregular from portion to portion or the amount decreases in progress of plating on the contrary.

In order to eliminate these drawbacks and improve the irregularity or the decrease in the thickness of plated metal, the present inventors made intensive studies and found useful for that a mechanical plating process comprising shaving metal off from a pure metal or alloy block and plating an object to be plated with the shaved off metal by the use of at least a single metal brush, wherein the metal block and the metal brush are in frictional contact with each other, and the object to be plated and the metal brush are concurrently in frictional contact with each other, characterized by continuously conducting the mechanical plating process while moving the metal block in such a way as to always re-fresh the surface of the metal brush. In other words this mechanical plating process is characterized in that the metal block is moved in such a way that a fresh surface of the metal block is kept in contact with the metal brush.

This mechanical plating process can be characterized in another way by continuously conducting it while removing metal crust formed on the metal block by the contact of the metal block and the metal brush with a grinder or a cutting tool so as to refresh the surface of the metal block.

Like this, according to this invention, metal to be plated on the object can be made uniform in thickness by moving the metal block or by removing metal crust on the metal block with a grinder or a cutting tool so that the surface of the metal block to come into contact with the metal brush can always be refreshed.

Also, according to this invention, in order that these processes may be conducted more continuously, a grinder or a cutting tool can be brought into contact with the metal brush in order to remove troublesome metal particles from the metal brush, which are not plated on the object but cling to the metal brush.

As for the type of the grinder or the cutting tool, there is no limitation in particular if only they are able to shave the metal block or the metal brush. Moreover, as for the shape of the metal block, there is also no restriction in particular if only it has a face with which it can come into good contact with the metal brush.

This invention will be described below in more detail with reference to the drawings. As shown in FIGS. 2(c) and (d), 1 denotes a metal brush; 2 denotes a cylindrical metal bar (FIG. 2(c)) or metal foil (FIG. 2(d)); 3 denotes an object to be plated; 4 denotes a grinder (FIG. 2(c)) or an endless belt type abraser (FIG. 2(d)); and 5 denotes a plated metal layer.

The metal layer 5 can be plated mechanically on the object 3 by means of the metal brush 1 in contact with the metal block 2 and the object 3 with the metal brush 1 being rotated as rapidly as its circumferential speed attains about 2000 meters a minute. Also, the metal block 2 can be refreshed continuously by bringing the grinder or the abraser 4 into contact with it.

If plating should be conducted with the metal block being not moved or with the grinder/abraser being not in contact with the metal brush, metal particles, having not been plated on the object but clinging to the metal brush, cling to the metal block again, and they form a hard, tenacious crust there, whereby not only does it take many hours for plating but also the thickness of plated metal layer would possibly decrease. However, when plating is conducted with the metal block being moved or with a hard metal crust forming on the metal block being removed as this invention teaches, the metal brush can always come into contact with the fresh surface of the metal block; in consequence, there is no problem of the decrease or the wearing off of plated metal layer. Also, when the grinder or the cutting tool is brought into contact with the metal brush, metal particles having not been plated on the object but still clinging to the metal brush are removed from the metal brush, and they hardly form such a hard, tenacious crust that uniform plating can be conducted for hours continuously.

This invention will be detailed more concretely with reference to the following examples; however, it is never to be construed to be limited by the examples.

Example 1

Table 1 shows examples of a metal brush, a metal block, and an object to be plated in combinative use according to this invention. Table 2 shows their outstanding combinations, the plating condition (in terms of the rotation of the metal brush), and the thickness of plated metal layer resulting therefrom.

As apparent from Table 2, each of the combinations gives a plated metal layer uniform in thickness. Having a strong adhesion to the object, the plated metal layer does not flake off readily.

TABLE 1

| Metal block (Plating material) | Metal brush | Object to be plated |
| --- | --- | --- |
| Aluminium | SUS 304 | SUS 304 |
|  | Hard steel wire | SUS 430 |
|  | Copper | Fe-42% Ni alloy |
| Copper | SUS 304 | SUS 304 |
|  | Hard steel wire | SUS 430 |
|  | SUS 304 | Fe-42% Ni alloy |
| Solder | Hard steel wire | SUS 304 |
|  | Brass | Fe-42% Ni alloy |

TABLE 2

| Combination: Metal block + metal brush + object to be plated | Rotation of brush | Thickness of plated metal |
| --- | --- | --- |
| Al + Cu + SUS 304 | 2400 rpm | 0.8 μm |
| Cu + Hard steel wire + SUS 430 | 2700 | 0.7 |
| Solder + Cu + Fe-42% Ni alloy | 2100 | 1.0 |

EXAMPLE 2

While a metal brush, 200 mm across by 100 mm long, planted with lots of 0.25 mm thick hard steel wires is being rotated at 2500 rpm, a copper block, 50 mm thick by 100 mm wide by 200 mm long, is pressed against the brush. Also, a length of SUS 304 stainless steel strip of the thickness 1.0 mm and the width 100 mm moving at the rate 2.0 m/minute is pressed against the brush. The thickness of plated copper layer along the longitudinal direction of the stainless steel strip is shown in FIG. 3, where solid circles indicate the result according to this invention (corresponding to FIG. 2(a)), obtained with the rotating hard steel brush being in contact with a grinder, and open circles indicate the result according to a comparative example, obtained with the rotating hard steel brush being not in contact with the grinder.

EXAMPLE 3

Figure 4:
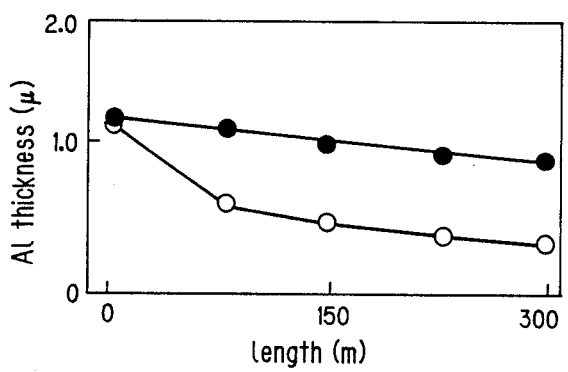
FIG. 4 is a graph showing a change in the thickness of plated aluminium layer along the longitudinal direction of metal foil in Example 3.

While a metal brush, 300 mm across by 500 mm long, planted with lots of 0.1 mm thick SUS 304 wires is being rotated at 2000 rpm, an aluminium block, 100 mm by 500 mm wide by 400 mm long, is pressed against the brush. Also, a length of Fe-42% Ni alloy strip of the thickness 2.0 mm and the width 500 mm moving at the rate 1.0 m/minute is pressed against the brush. The thickness of plated aluminium layer along the longitudinal direction of the alloy strip is shown in FIG. 4, where solid circles indicate the result according to this invention (Corresponding to FIG. 2 (b)), obtained with the rotating SUS 304 brush being in contact with an endless belt type abraser, and open circles indicate the result according to a comparative example, obtained with the same brush being not in contact with the abraser.

EXAMPLE 4

While a metal brush, 250 mm across by 100 mm long, planted with lots of 0.2 mm thick hard steel wires is being rotated at 2500 rpm, a cylindrical aluminium bar, 100 mm across by 100 mm long, is pressed against the brush with its circumferential speed at 0.5 m/minute. Also, a length of SUS 304 stainless steel strip of the thickness 1.0 mm and the width 100 mm moving at the rate 1.0 m/minute is pressed against the brush.

Figure 5:
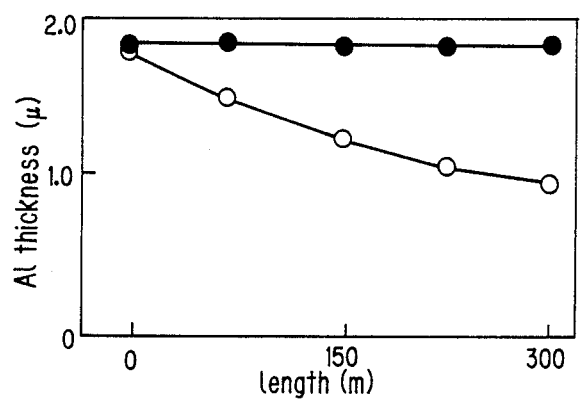
FIG. 5 is a graph showing a change in the thickness of plated aluminium layer along the longitudinal direction of metal foil in Example 4.

The thickness of plated aluminium layer along the longitudinal direction of the stainless steel strip is shown in FIG. 5, where solid circles indicate the result according to this invention (corresponding to FIG. 2(c)), obtained with the rotating aluminium bar being in contact with a grinder, and open circles indicate the result according to a comparative example, obtained with the aluminium bar being in contact with the grinder but not rotated.

EXAMPLE 5

While a metal brush, 300 mm across by 500 mm long, planted with lots of 0.1 mm thick SUS 304 stainless steel wires is being rotated at 2000 rpm, a length of copper strip, 2.0 mm thick by 500 mm wide, is pressed against the brush. Also, a length of Fe-42% Ni alloy strip of the thickness 1.5 mm and the width 500 mm is pressed against the brush.

Figure 6:
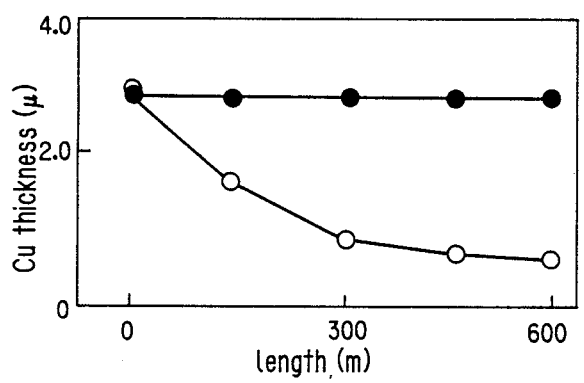
FIG. 6 is a graph showing a change in the thickness of plated copper layer along the longitudinal direction of metal foil in Example 5.

The thickness of plated copper layer along the longitudinal direction of the alloy strip is shown in FIG. 6, where solid circles indicate the result according to this invention (Corresponding to FIG. 2(d)), obtained with the copper belt, always in contact with an endless belt type abraser, being moved, and open circles indicate the result according to a comparative example, obtained with the copper belt, always in contact with the endless belt type abraser, being not moved.

As seen from the above, the mechanical plating process of this invention is conducted with a metal block, a metal brush, and an object to be plated being in contact with one another with the metal brush in between; therefore, it does not need various tanks and expensive chemical solutions; thus, it is much cheaper than the conventional electroplating or the chemical plating process. Additionally, according to this invention, not only can there be formed a uniform metal layer strongly adhered to an object but also it is possible to eliminate problems in conventional mechanical plating process, such as the brush wire is subject to oxidation, expensive and easy to fall out. Moreover, with the mechanical plating process of this invention, a variety of pure metals or alloys can be plated firmly on top of other metals far cheaper than with conventional processes. Metals thus plated on show such a property of those fully adhered to substrate that there can be produced plated goods superior in platability, solderability, electro-conductivity, corrosion resistance, heat resistance, abrasion resistance, and decorability.

What is claimed is:

1. A mechanical plating process, comprising shaving metal off from a pure metal or alloy block and plating a metallic object to be plated with said shaved off metal by the use of at least a single metal brush, wherein said metal block and said metal brush are in frictional contact with each other, and said object to be plated and said metal brush are concurrently in frictional contact with each other, characterized by conducting said mechanical plating process while removing small metal particles from said metal brush with a grinder or a cutting tool, said small metal particles being shaved off from said metal block but not yet plated on said object and still clinging to said metal brush.

2. A mechanical plating process comprising shaving metal off from a pure metal or alloy block and plating a metallic object to be plated with said shaved off metal by the use of at least a single metal brush, wherein said metal block and said metal brush are in frictional contact with each other, and said object to be plated and said metal brush are concurrently in frictional contact with each other, characterized by continuously conducting said mechanical plating process while removing metal crust formed on said metal block by the contact of said metal block and said metal brush with a grinder or a cutting tool so as to re-fresh the surface of said metal block.

3. A mechanical plating process comprising shaving metal off from a pure metal or alloy block and plating a metallic object to be plated with said shaved off metal by the use of at least a single metal brush, wherein said metal block and said metal brush are in frictional contact with each other, and said object to be plated and said metal brush are concurrently in frictional contact with each other, characterized by continuously conducting said mechanical plating process while moving said metal block in such a way that a fresh surface of the metal block is kept in contact with said metal brush, and while removing small metal particles from said metal brush with a grinder or a cutting tool, said small metal particles being shaved off from said metal block but not yet plated on said object and still clinging to said metal brush.

4. A mechanical plating process comprising shaving metal off from a pure metal or alloy block and plating a metallic object to be plated with said shaved off metal by the use of at least a single metal brush, wherein said metal block and said metal brush are in frictional contact with each other, and said object to be plated and said metal brush are concurrently in frictional contact with each other, characterized by continuously conducting said mechanical plating process while removing metal crust formed on said metal block by the contact of said metal block and said metal brush with a grinder or a cutting tool so as to re-fresh the surface of said metal block, and while removing small metal particles from said metal brush with a grinder or a cutting tool, said small metal particles being shaved off from said metal block but not yet plated on said object and still clinging to said metal brush.

* * * * *